(12) United States Patent
Zheng

(10) Patent No.: US 11,003,941 B2
(45) Date of Patent: May 11, 2021

(54) CHARACTER IDENTIFICATION METHOD AND DEVICE

(71) Applicant: Hangzhou Hikvision Digital Technology Co., Ltd., Hangzhou (CN)

(72) Inventor: Gang Zheng, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 82 days.

(21) Appl. No.: 16/464,922

(22) PCT Filed: Oct. 12, 2017

(86) PCT No.: PCT/CN2017/105843
§ 371 (c)(1),
(2) Date: May 29, 2019

(87) PCT Pub. No.: WO2018/099194
PCT Pub. Date: Jun. 7, 2018

(65) Prior Publication Data
US 2020/0311460 A1    Oct. 1, 2020

(30) Foreign Application Priority Data
Nov. 30, 2016   (CN) .......................... 201611082212.4

(51) Int. Cl.
G06K 9/46    (2006.01)
G06K 9/32    (2006.01)
(Continued)

(52) U.S. Cl.
CPC ............... G06K 9/46 (2013.01); G06K 9/325 (2013.01); G06K 9/6256 (2013.01);
(Continued)

(58) Field of Classification Search
CPC combination set(s) only.
See application file for complete search history.

(56) References Cited

U.S. PATENT DOCUMENTS 5,299,269 A * 3/1994 Gaborski ................. G06K 9/66
382/156
8,965,112 B1 * 2/2015 Ibarz .................... G06K 9/3258
382/156
(Continued)

FOREIGN PATENT DOCUMENTS

CN    104298976 A    1/2015
CN    105184312 A    12/2015
(Continued)

OTHER PUBLICATIONS

International Search Report for International Application No. PCT/CN2017/105843 dated Jan. 11, 2018.
(Continued)

*Primary Examiner* — Tsung Yin Tsai
(74) *Attorney, Agent, or Firm* — Clements Bernard Walker; Lawrence A. Baratta, Jr.

(57) ABSTRACT

Embodiments of the present application provide a character recognition method and device. The method includes obtaining a target image to be analyzed which contains a character (S101); inputting the target image into a pre-trained deep neural network to determine a feature map corresponding to a character region of the target image (S102); and performing character recognition on the feature map corresponding to the character region by the deep neural network to obtain the character contained in the target image (S103). The deep neural network is obtained by training with sample images, a result of labeling character regions in the sample images, and characters contained in the sample images. The method can improve the accuracy of character recognition.

10 Claims, 3 Drawing Sheets

(51) Int. Cl.
 *G06K 9/62* (2006.01)
 *G06N 3/08* (2006.01)
(52) U.S. Cl.
 CPC .............. *G06K 9/6267* (2013.01); *G06N 3/08* (2013.01); *G06K 2209/01* (2013.01)

(56) References Cited

U.S. PATENT DOCUMENTS

| | | | | |
|---|---|---|---|---|
| 10,043,112 | B2* | 8/2018 | Talathi | G06K 9/6269 |
| 2017/0262723 | A1* | 9/2017 | Kozitsky | G06K 9/6267 |
| 2018/0032844 | A1* | 2/2018 | Yao | G06K 9/66 |
| 2019/0073551 | A1* | 3/2019 | Pu | G06K 9/00624 |

FOREIGN PATENT DOCUMENTS

| | | |
|---|---|---|
| CN | 105335760 A | 2/2016 |
| CN | 105608454 A | 5/2016 |
| CN | 105678293 A | 6/2016 |
| CN | 105787524 A | 7/2016 |

OTHER PUBLICATIONS

Ganapathy Velappa et al.:, "A Malaysian Vehicle License Plate Localization and Recognition System", Journal of Systemics, Cybernetics and Informatics, Feb. 1, 2008, pp. 13-20, XP55637729, Retrieved from the Internet: URL:http://www.iiisci.org/journal/CV$/sci/pdfs/S985FYB.pdf.
Hui Li et al.:, "Reading Car License Plates Using Deep Convolutional Neural Networks and LSTMs", ARXIV.org, Cornell University Library, 201 Olin Library Cornell University Ithaca, Jan. 21, 2016, pp. 1-17, XP080679695, NY 14853.
CN application No. 201611082212.4 dated Mar. 25, 2021 in connection with the captioned US application.

* cited by examiner

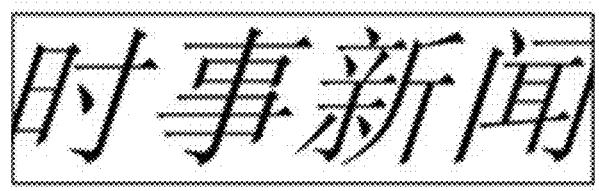
FIG. 3(a)
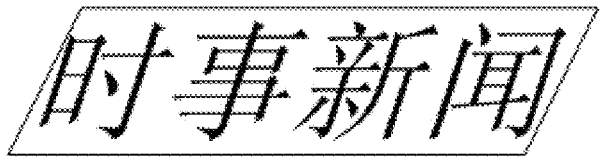
FIG. 3(b)
```
Obtaining sample images, a result of labeling character
regions in the sample images, and characters contained in the    ~ S201
                         sample image
                              |
                              v
Training the deep neural network with the sample images, the
result of the labeling character regions in the sample images    ~ S202
       and the characters contained in the sample images
```
FIG. 4

CHARACTER IDENTIFICATION METHOD AND DEVICE

The present application claims the priority to a Chinese patent application No. 201611082212.4 filed with the State Intellectual Property Office of People's Republic of China on Nov. 30, 2016 and entitled "Character Identification Method and Device", which is incorporated herein by reference in its entirety.

TECHNICAL FIELD

The present application relates to the technical field of image processing, and in particular, to a character recognition method and device.

BACKGROUND

With the development of image processing technologies, more and more information can be obtained from images. For example, such as the license plate number of a vehicle or a building sign in a monitoring image can be obtained by recognizing the image; or the tracking number of a delivery can be obtained by identifying the order for the delivery.

In an existing character recognition method, generally a character region in an image is detected according to artificially designed features. The character region is then segmented to obtain character blocks for each character. The character block is recognized by means of a classifier to obtain the characters in the image.

However, in the above method, detecting the character region in the image and segmenting the character region are performed based on the artificially designed features. In practice, qualities of images may vary greatly depending on different scenarios, different shooting conditions, or the like. The artificially designed features are not well adapted to images of various qualities. This results in low accuracy of character region detection and character region segmentation, and further leads to low accuracy of character recognition.

SUMMARY

An embodiments of the present application is to provide a character recognition method and device to improve the accuracy of character recognition. The specific technical solutions are as follows.

In a first aspect, an embodiment of the present application provides a character recognition method, which includes:

obtaining a target image to be analyzed which contains a character;

inputting the target image into a pre-trained deep neural network to determine a feature map corresponding to a character region of the target image; and performing character recognition on the feature map corresponding to the character region by the deep neural network to obtain the character contained in the target image;

wherein the deep neural network is obtained by training with sample images, a result of labeling character regions in the sample images, and characters contained in the sample images.

Optionally, the step of determining a feature map corresponding to a character region of the target image includes:

determining candidate regions in the target image according to a preset segmentation rule;

extracting features of the candidate regions to obtain feature maps corresponding to respective candidate regions; and recognizing a feature map containing a character from the feature maps corresponding to respective candidate regions, and determining the recognized feature map as the feature map corresponding to the character region of the target image.

Optionally, after the step of determining candidate regions in the target image, the method further includes:

adjusting a position and/or shape of each candidate region.

Optionally, the step of determining a feature map corresponding to a character region of the target image includes:

extracting a feature of the target image to obtain a feature map corresponding to the target image; and analyzing the feature map corresponding to the target image at pixel-level to recognize a region containing a character, and determining a feature map corresponding to the recognized region as the feature map corresponding to the character region in the target image.

Optionally, the deep neural network includes at least a convolutional neural network, a recurrent neural network, a classifier and a sequence decoder. The step of performing character recognition on the feature map corresponding to the character region by the deep neural network to obtain the character contained in the target image includes:

extracting a feature of the character region at character-level by the convolutional neural network;

extracting a context feature of the character region by the recurrent neural network; and performing classification and recognition on the extracted feature map by the classifier and the sequence decoder to obtain the character contained in the target image.

Optionally, the training process of the deep neural network includes:

obtaining sample images, a result of labeling character regions in the sample images, and characters contained in the sample image; and training the deep neural network with the sample images, the result of the labeling character regions in the sample images and the characters contained in the sample images.

In a second aspect, an embodiment of the present application provides a character recognition device, which includes:

a first obtaining module, configured for obtaining a target image to be analyzed which contains a character;

a determining module, configured for inputting the target image into a pre-trained deep neural network to determine a feature map corresponding to a character region of the target image; and a recognizing module, configured for performing character recognition on the feature map corresponding to the character region by the deep neural network to obtain the character contained in the target image;

wherein the deep neural network is obtained by training with sample images, a result of labeling character regions in the sample images, and characters contained in the sample images.

Optionally, the determining module includes:

a determining sub-module, configured for determining candidate regions in the target image according to a preset segmentation rule;

a first extracting sub-module, configured for extracting features of the candidate regions to obtain feature maps corresponding to respective candidate regions; and a first recognizing sub-module, configured for recognizing a feature map containing a character from the feature maps corresponding to respective candidate regions, and determining the recognized feature map as the feature map corresponding to the character region of the target image.

Optionally, the device further includes:

an adjusting module, configured for adjusting a position and/or shape of each candidate region.

Optionally, the determining module includes:

a second extracting sub-module, configured for extracting a feature of the target image to obtain a feature map corresponding to the target image; and a second recognizing sub-module, configured for analyzing the feature map corresponding to the target image at pixel-level to recognize a region containing a character, and determining a feature map corresponding to the recognized region as the feature map corresponding to the character region in the target image.

Optionally, the deep neural network includes at least a convolutional neural network, a recurrent neural network, a classifier and a sequence decoder. The recognizing module includes:

a third extracting sub-module, configured for extracting a feature of the character region at character-level by the convolutional neural network;

a fourth extracting sub-module, configured for extracting a context feature of the character region by the recurrent neural network; and a third recognizing sub-module, configured for performing classification and recognition on the extracted feature map by the classifier and the sequence decoder to obtain the character contained in the target image.

Optionally, the device further includes:

labeling character region of the sample images, and characters contained in the sample image; and a training module, configured for training the deep neural network with the sample images, the result of the labeling character regions of the sample images and the characters contained in the sample images.

In a third aspect, an embodiment of the present application provides an electronic device including:

a processor, a memory, a communication interface and a bus, wherein the processor, the memory and the communication interface are connected and communicate with each other via the bus;

the memory stores executable program codes; and the processor executes a program corresponding to the executable program codes by reading the executable program codes stored in the memory to carry out the character recognition method according to the first aspect of the present application.

In a fourth aspect, the present application provides a storage medium, wherein the storage medium is configured to store executable program codes that, when executed, performs the character recognition method according to the first aspect of the present application.

In a fifth aspect, the present application provides an application program that, when executed, performs the character recognition method according to the first aspect of the present application.

In the embodiment of the present application, the deep neural network can be trained in advance with sample images, a result of labeled character regions of the sample images, and characters contained in the sample images. When performing character recognition, after the target image containing a character is obtained, the target image is input into the deep neural network. A feature map corresponding to a character region of the target image can be accurately determined, and the feature map corresponding to each character region can be recognized by the deep neural network. The character contained in the target image is thus accurately obtained.

BRIEF DESCRIPTION OF THE DRAWINGS

In order to more clearly illustrate the technical solutions of the embodiments of the present application or the related art, the drawings used for the embodiments or the related art will be briefly described below. Obviously, drawings described below are only for some embodiments of the application, other drawings may be obtained from these drawings by those of ordinary skill in the art without any creative efforts.

FIG. 3(a) schematically shows a character region according to an embodiment of the present application;

FIG. 3(b) schematically shows the character region shown in FIG. 3(a) which has been adjusted;

FIG. 4 is another flowchart of a character recognition method according to an embodiment of the present application;

DETAILED DESCRIPTION OF THE INVENTION

In order to improve the accuracy of character recognition, embodiments of the present application provide a character recognition method and device.

The technical solutions of the embodiments of the present application will be clearly and fully described below with reference to the drawings for the embodiments of the present application, Obviously, the described embodiments are only some of the embodiments of the present application, and not all of the embodiments. All other embodiments obtained by one having ordinary skills in the art based on the embodiments herein without any creative efforts fall within the protection scope of the present application.

It should be noted that the embodiments in the present application and the features in the embodiments may be combined with each other if there is no conflict. The present application will be described in detail below with reference to the accompanying drawings.

Figure 1:
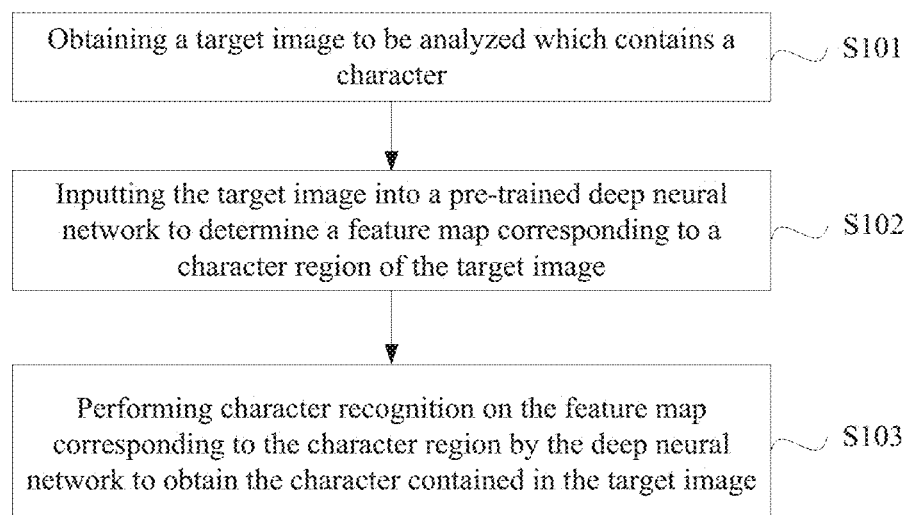
FIG. 1 is a flowchart of a character recognition method according to an embodiment of the present application.

In order to improve the accuracy of character recognition, an embodiment of the present application provides a character recognition method. As shown in FIG. 1, the process of the method may include the steps S101-S103.

Step S101, obtaining a target image to be analyzed which contains a character.

The method provided by the embodiment of the present application is applicable to an electronic device. Specifically, the electronic device may be a desktop computer, a portable computer, a smart mobile terminal, or the like.

In the embodiment of the present application, the electronic device can recognize a character or characters in an image. For example, the electronic device may recognize an image captured by an image acquisition device on the road to obtain a license plate number in the image; or the electric device may recognize characters in an image taken by a user to obtain information of the character contained in the image.

To recognize a character in an image acquired by an image acquisition device, a wired or wireless connection may be established between the image acquisition device and the electronic device, so that the image acquisition device can send the captured images to the electronic device. For example, the connection between the image acquisition device and the electronic device can be established through a wireless connection technique such as WIFI (Wireless Fidelity), NEC (Near Field Communication), Bluetooth, or the like, which is not limited thereto. A user may input the image he/she has taken into the electronic device such that the electronic device performs character recognition on the image.

Figure 2:
FIG. 2 schematically shows a target image containing characters according to an embodiment of the present application.

Therefore, in the embodiment of the present application, the electronic device may receive a target image transmitted by an image acquisition device or a target image input by a user for recognizing a character contained in the target image. Referring to FIG. 2, an example of the target image containing characters which is obtained by the electronic device is depicted.

It should be noted that, in an embodiment of the present application, the electronic device may obtain the target image by using other methods, which is not limited herein.

Step S102, inputting the target image into a pre-trained deep neural network to determine a feature map corresponding to a character region of the target image.

In an embodiment of the present application, in order to improve the accuracy of character recognition, the electronic device may obtain the deep neural network by training in advance with a certain number of sample images, such as 100 images, 500 images, 1000 images, a result of labeled character regions of the sample images, and characters contained in the sample images. When the target image containing a character is input into the trained deep neural network, the deep neural network can determine a feature map corresponding to the character region of the target image, and obtain the character contained in the target image according to the feature map.

In an embodiment of the present application, after the target image containing a character or characters are obtained, the electronic device can input the target image into the pre-trained deep neural network to detect regions on the target image and to recognize a character region containing a character or characters, in addition, a feature map corresponding to each character region can be determined.

For example, upon obtaining the target image such as shown in FIG. 2, the electronic device may determine the character region in the target image as the region 210 by the deep neural network. Moreover, the feature map corresponding to the character region can be obtained by performing feature extraction by the deep neural network.

S103, performing character recognition on the feature map corresponding to the character region by the deep neural network to obtain the character contained in the target image.

In the embodiment of the present application, after a feature map corresponding to a character region of the target image is determined, the electronic device can further perform character recognition on the feature map corresponding to the character region by the deep neural network to obtain a character contained in the target image. For example, character regions can be separately recognized through the deep neural network to obtain characters contained in respective character regions, thereby obtaining the characters contained in the target image.

For example, for a target image as shown in FIG. 2, the electronic device recognizes that the characters contained therein are 粤 FC508.

In the embodiment of the present application, the deep neural network can be obtained by training in advance with sample images, a result of labeled character regions of the sample images and characters contained in the sample images. In performing character recognition, after a target image containing a character is obtained, the target image is input into the deep neural network. A feature map corresponding to each character region of the target image can be accurately determined. The character or characters contained in the target image can thus be accurately obtained by performing character recognition on the feature map corresponding to each character region by the deep neural network In an implementation of the embodiment of the present application, to determine a feature map corresponding to a character region of the target image, the electronic device can determine each candidate region contained in the target image according to a preset segmentation rule, such as the size or the shape of the candidate region. For example, rectangular candidate regions having a size of 20 pixels*30 pixels can be determined on the target image. The candidate regions may or may not overlap with each other, which is not limited herein.

Next, the electronic device may extract features for candidate regions to obtain feature maps corresponding to the candidate regions; and recognize a feature map containing a character from the feature maps corresponding to the candidate regions. The recognized feature map is determined as the feature map corresponding to the character region of the target image.

In an implementation of the embodiment of the present application, in some cases, there may be characters of various formats in the target image; and the character region may not have a regular shape such as a rectangle or a square, instead, it may have another shape such as a parallelogram. Therefore, after the target image is segmented into a plurality of regular patterns, the detected character region may not be that accurate.

For example, in the case that the characters are in italic as shown in FIG. 3(*a*) and the preset rule is to segment the target image into rectangular candidate regions, the obtained character region may be the region as shown in FIG. 3(*a*). As can be seen from FIG. 3(*a*), the obtained character region does not contain exactly all the character contents.

In an embodiment of the present application, after the candidate regions in the target image are determined, the position and/or shape of each candidate region may be adjusted. For example, the candidate regions may be for example rotated or translated.

Specifically, during the training of the deep neural network, a vector for adjusting character regions can be trained with character regions of irregular shapes in sample images. In the process of the character recognition, the position and/or shape of each candidate region may be adjusted according to the trained vector.

For example, the character region shown in FIG. 3(a) may be adjusted to obtain a character region as shown in FIG. 3(b). As can be seen from FIG. 3(b), the adjusted character region contains all the character contents accurately.

In an implementation of the embodiment of the present application, determining the feature map corresponding to the character region of the target image, the electronic device may first extract features of the target image to obtain the feature map corresponding to the target image. The electronic device may then analyze the feature map corresponding to the target image at pixel-level to recognize a region containing a character or characters, and determine the feature map corresponding to the recognized region as the feature map corresponding to the character region in the target image.

For example, after the feature map corresponding to the target image is obtained, the electronic device may analyze pixels for the feature map one by one in a set analysis order, such as in an order from left to right or from top to bottom, to recognize the pixels containing characters. After the analysis is completed, a region formed by the pixels for a character is determined. Last, the feature map corresponding to this region is determined as the feature map corresponding to the character region in the target image.

In an implementation of the embodiment of the present application, the deep neural network in this embodiment may include at least such as a convolutional neural network, a recurrent neural network, a classifier, a sequence decoder.

Convolutional Neural Network (CNN) is a feed-forward artificial neural network. A neuron can respond to surrounding units within a limited range. CNN can effectively extract information of the structure of an image through weight sharing and feature aggregation.

Recurrent Neural Network (RNN) is an artificial neural network with a recurrent structure. The calculation of the features of a current sequence can be based on context information with the pass of hidden layer features in the sequence direction. RNN is suitable for deep learning modeling of complex sequence problems (such as time, space, etc.) by weight sharing and feature aggregation.

The electronic device performs character recognition on the feature map corresponding to each character region by the deep neural network to obtain a character contained in the target image. Specifically, the electronic device may first extract the features of each character region at character-level by the convolutional neural network; then extract the context features of each character region by the recurrent neural network; and classify and recognize the extracted feature map by the classifier and the sequence decoder to obtain the character contained in the target image.

In the embodiment of the present application, the electronic device may train the deep neural network for character recognition in advance. Specifically, as shown in FIG. 4, the character recognition method according to an embodiment of the present application may further include steps S201-S202.

Step S201, obtaining sample images, a result of labeled character regions of the sample images, and characters contained in the sample images.

In the embodiment of the present application, in training the deep neural network, the electronic device may first obtain sample images. For example, the electronic device can obtain as many sample images as possible, such as 100 images, 500 images or 1000 images, which may all contain characters. Moreover, in order to adapt the character recognition to images of different qualities and to adapt to characters of different formats, the characters contained in the sample images may be in a variety of formats. For example, the sample images may contain characters having different fonts, sizes, patterns, and the like.

In the embodiment of the present application, a user can label the character regions on the sample images, and input the labeled result into the electronic device. In addition, characters contained in the sample images can be input into the electronic device. Therefore, the electronic device can obtain the sample images, the labeled result of character regions in the sample images, and the characters contained in the sample images.

Step S202, training the deep neural network with the sample images, a result of the labeled character regions of the sample images, and the characters contained in the sample images.

After the sample images, the labeled character regions of the sample images, and the characters contained in the sample images, the electronic device may use the sample images, the labeled character regions of the sample images and the characters contained in the sample images as training samples to train and thereby obtain the deep neural network.

It should be noted that, in the embodiment of the present application, the deep neural network may trained by any existing method. For example, the electronic device may use a back propagation algorithm to train the deep neural network. The gradient of the network parameters may be calculated by the stochastic gradient descent method. Alternatively, other methods may be used to train the deep neural network, which will not be described herein.

In the embodiment of the present application, the deep neural network can be trained in advance with sample images, a result of labeled character regions of the sample images, and characters contained in the sample images. When performing character recognition, after the target image containing a character is obtained, the target image is input into the deep neural network. A feature map corresponding to a character region of the target image can be accurately determined, and the feature map corresponding to each character region can be recognized by the deep neural network. The character contained in the target image is thus accurately obtained.

Corresponding to the above method embodiments, an embodiment of the present application provides corresponding device embodiments.

Figure 5:
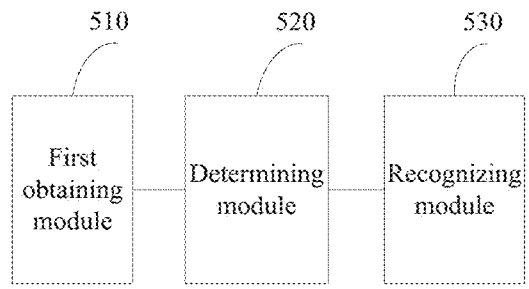
FIG. 5 is a schematic diagram of a structure of a character recognition device according to an embodiment of the present application.

FIG. 5 illustrates a character recognition device according to an embodiment of the present application. The device includes:

a first obtaining module 510, configured for obtaining a target image to be analyzed which contains a character;

a determining module 520, configured for inputting the target image into a pre-trained deep neural network to determine a feature map corresponding to a character region of the target image; and a recognizing module 330, configured for performing character recognition on the feature map corresponding to the character region by the deep neural network to obtain the character contained in the target image;

wherein the deep neural network is obtained by training with sample images, a result of labeling character regions in the sample images, and characters contained in the sample images.

In the embodiment of the present application, the deep neural network can be trained in advance with sample images, a result of labeled character regions of the sample images, and characters contained in the sample images. When performing character recognition, after the target image containing a character is obtained, the target image is input into the deep neural network. A feature map corresponding to a character region of the target image can be accurately determined, and the feature map corresponding to each character region can be recognized by the deep neural network. The character contained in the target image is thus accurately obtained.

In an implementation of the embodiment of the present application, the determining module 520 includes:

a determining sub-module (not shown in the figure), configured for determining candidate regions in the target image according to a preset segmentation rule;

a first extracting sub-module (not shown in the figure), configured for extracting features of the candidate regions to obtain feature maps corresponding to respective candidate regions; and a first recognizing sub-module (not shown in the figure), configured for recognizing a feature map containing a character from the feature maps corresponding to respective candidate regions, and determining the recognized feature map as the feature map corresponding to the character region of the target image.

In an implementation of the embodiment of the present application, the device further includes:

an adjusting module (not shown in the figure), configured for adjusting a position and/or shape of each candidate region.

In an implementation of the embodiment of the present application, the determining module 520 includes:

a second extracting sub-module (not shown in the figure), configured for extracting a feature of the target image to obtain a feature map corresponding to the target image; and a second recognizing sub-module (not shown in the figure), configured for analyzing the feature map corresponding to the target image at pixel-level to recognize a region containing a character, and determining a feature map corresponding to the recognized region as the feature map corresponding to the character region in the target image.

In an implementation of the embodiment of the present application, the deep neural network includes at least a convolutional neural network, a recurrent neural network, a classifier and a sequence decoder. The recognizing module 530 includes:

a third extracting sub-module (not shown in the figure), configured for extracting a feature of the character region at character-level by the convolutional neural network;

a fourth extracting sub-module (not shown in the figure), configured extracting a context feature of the character region by the recurrent neural network; and a third recognizing sub-module (not shown in the figure), configured performing classification and recognition on the extracted feature map by the classifier and the sequence decoder to obtain the character contained in the target image.

Figure 6:
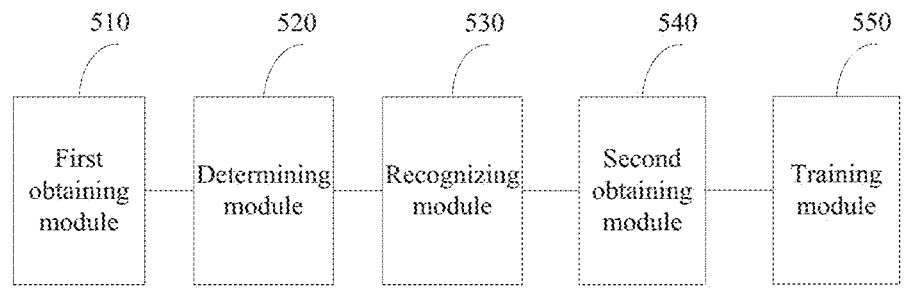
FIG. 6 is a schematic diagram of another structure of a character recognition device according to an embodiment of the present application.

In an implementation of the embodiment of the present application, as shown in FIG. 6, the device further includes:

a second obtaining module 540, configured for obtaining sample images, a result of labeling character region of the sample images, and characters contained in the sample image; and a training module 550, configured for training the deep neural network with the sample images, the result of the labeling character regions of the sample images and the characters contained in the sample images.

Figure 7:
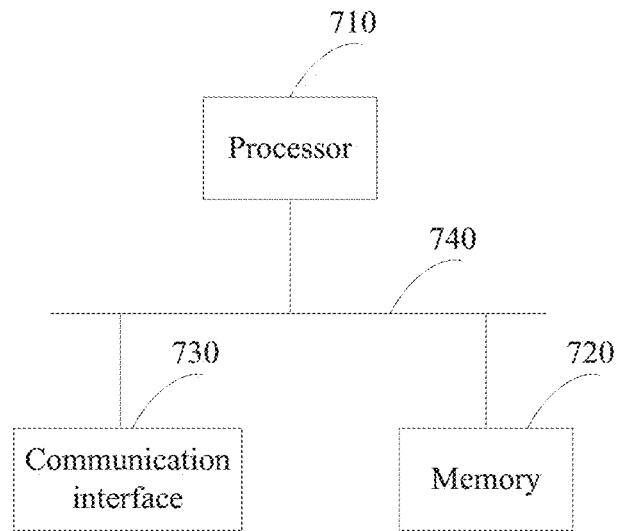
FIG. 7 is a schematic diagram of a structure of an electronic device according to an embodiment of the present application.

Correspondingly, as shown in FIG. 7, an embodiment of the present application further provides an electronic device, which can include:

a processor 710, a memory 720, a communication interface 730 and a bus 740.

The processor 710, the memory 720 and the communication interface 730 are connected and communicate with each other via the bus 740.

The memory 720 stores executable program codes.

The processor 710 executes a program corresponding to the executable program codes by reading the executable program codes stored in the memory 720 to carry out the character recognition method according to the embodiments of the present application. The character recognition method includes:

obtaining a target image to be analyzed which contains a character;

inputting the target image into a pre-trained deep neural network to determine a feature map corresponding to a character region of the target image; and performing character recognition on the feature map corresponding to the character region by the deep neural network to obtain the character contained in the target image;

wherein the deep neural network is obtained by training with sample images, a result of labeling character regions in the sample images, and characters contained in the sample images.

In the embodiment of the present application, the deep neural network can be trained in advance with sample images, a result of labeled character regions of the sample images, and characters contained in the sample images. When performing character recognition, after the target image containing a character is obtained, the target image is input into the deep neural network. A feature map corresponding to a character region of the target image can be accurately determined, and the feature map corresponding to each character region can be recognized by the deep neural network. The character contained in the target image is thus accurately obtained.

Correspondingly, an embodiment of the present application further provides a storage medium. The storage medium is configured to store executable program codes that, when executed, performs the character recognition method according to the embodiment of the present application. The character recognition method includes:

obtaining a target image to be analyzed which contains a character;

inputting the target image into a pre-trained deep neural network to determine a feature map corresponding to a character region of the target image; and performing character recognition on the feature map corresponding to the character region by the deep neural network to obtain the character contained in the target image;

wherein the deep neural network is obtained by training with sample images, a result of labeling character regions in the sample images, and characters contained in the sample images.

In the embodiment of the present application, the deep neural network can be trained in advance with sample images, a result of labeled character regions of the sample images, and characters contained in the sample images. When performing character recognition, after the target image containing a character is obtained, the target image is input into the deep neural network. A feature map corresponding to a character region of the target image can be accurately determined, and the feature map corresponding to each character region can be recognized by the deep neural network. The character contained in the target image is thus accurately obtained.

Correspondingly, an embodiment of the present application further provides an application program that, when executed, performs the character recognition method according to the embodiment of the present application. The character recognition method includes:

obtaining a target image to be analyzed which contains a character;

inputting the target image into a pre-trained deep neural network to determine a feature map corresponding to a character region of the target image; and performing character recognition on the feature map corresponding to the character region by the deep neural network to obtain the character contained in the target image;

wherein the deep neural network is obtained by training with sample images, a result of labeling character regions in the sample images, and characters contained in the sample images.

In the embodiment of the present application, the deep neural network can be trained in advance with sample images, a result of labeled character regions of the sample images, and characters contained in the sample images. When performing character recognition, after the target image containing a character is obtained, the target image is input into the deep neural network. A feature map corresponding to a character region of the target image can be accurately determined, and the feature map corresponding to each character region can be recognized by the deep neural network. The character contained in the target image is thus accurately obtained.

For the device/electronic device/storage medium/application program embodiment, since it is similar to the method embodiment, the description is relatively simple, and the relevant parts can be referred to the description of the method embodiment.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude other identical elements in the processes, methods, objects, or devices comprising this element.

The various embodiments in the present specification are described in a related manner, the same or similar parts between the various embodiments may be referred to each other, and each embodiment focuses on the differences from the other embodiments. In particular, for the system embodiment, since it is similar to the method embodiment, the description is relatively simple, and the relevant parts can be referred to the description of the method embodiment.

One of ordinary skill in the art can understand that all or part of the steps in implementing the above method embodiments can be completed by a program to instruct related hardware, and the program can be stored in a computer readable storage medium, which is referred to herein as storage media such as an ROM/RAM, disk, CD, etc.

The above description is only the preferred embodiment of the present application, and is not intended to limit the protection scope of the present application. Any modifications, equivalent substitutions, improvements, and the like, made within the spirit and principles of the present application fall within the protection scope of the present application.

The invention claimed is:

1. A character recognition method, comprising:
obtaining a target image to be analyzed which contains a character;
inputting the target image into a pre-trained deep neural network to determine a feature map corresponding to a character region of the target image; and
performing character recognition on the feature map corresponding to the character region by the deep neural network to obtain the character contained in the target image;
wherein the deep neural network is obtained by training with sample images, a result of labeling character regions in the sample images, and characters contained in the sample images;
wherein during the training of the deep neural network, a vector for adjusting character regions is trained with character regions of irregular shapes in the sample images;
wherein the step of determining a feature map corresponding to a character region of the target image comprises:
determining candidate regions in the target image according to a preset segmentation rule;
adjusting a position and/or shape of each candidate region according to the trained vector;
extracting features of the candidate regions to obtain feature maps corresponding to respective candidate regions; and
recognizing a feature map containing a character from the feature maps corresponding to respective candidate regions, and determining the recognized feature map as the feature map corresponding to the character region of the target image.

2. The method according to claim 1, wherein the step of determining a feature map corresponding to a character region of the target image comprises:
extracting a feature of the target image to obtain a feature map corresponding to the target image; and
analyzing the feature map corresponding to the target image at pixel-level to recognize a region containing a character, and determining a feature map corresponding to the recognized region as the feature map corresponding to the character region in the target image.

3. The method according to claim 1, wherein the deep neural network comprises at least a convolutional neural network, a recurrent neural network, a classifier and a sequence decoder; and wherein the step of performing character recognition on the feature map corresponding to the character region by the deep neural network to obtain the character contained in the target image comprises:
extracting a feature of the character region at character-level by the convolutional neural network;
extracting a context feature of the character region by the recurrent neural network; and
performing classification and recognition on the extracted feature map by the classifier and the sequence decoder to obtain the character contained in the target image.

4. The method according to claim 1, wherein the training process of the deep neural network comprises:
obtaining sample images, a result of labeling character regions in the sample images, and characters contained in the sample image; and
training the deep neural network with the sample images, the result of the labeling character regions in the sample images and the characters contained in the sample images.

5. A character recognition device, comprising:
a first obtaining module, configured for obtaining a target image to be analyzed which contains a character;
a determining module, configured for inputting the target image into a pre-trained deep neural network to determine a feature map corresponding to a character region of the target image;
a recognizing module, configured for performing character recognition on the feature map corresponding to the character region by the deep neural network to obtain the character contained in the target image;
a determining sub-module, configured for determining candidate regions in the target image according to a preset segmentation rule;
a first extracting sub-module, configured for extracting features of the candidate regions to obtain feature maps corresponding to respective candidate regions;
a first recognizing sub-module, configured for recognizing a feature map containing a character from the feature maps corresponding to respective candidate regions, and determining the recognized feature map as the feature map corresponding to the character region of the target image; and
an adjusting module, configured for adjusting a position and/or shape of each candidate region according to the trained vector;
wherein the deep neural network is obtained by training with sample images, a result of labeling character regions in the sample images, and characters contained in the sample images;
wherein during the training of the deep neural network, a vector for adjusting character regions is trained with character regions of irregular shapes in the sample images.

6. The device according to claim 5, wherein the determining module comprises:
a second extracting sub-module, configured for extracting a feature of the target image to obtain a feature map corresponding to the target image; and
a second recognizing sub-module, configured for analyzing the feature map corresponding to the target image at pixel-level to recognize a region containing a character, and determining a feature map corresponding to the recognized region as the feature map corresponding to the character region in the target image.

7. The device according to claim 5, wherein the deep neural network comprises at least a convolutional neural network, a recurrent neural network, a classifier and a sequence decoder; and wherein the recognizing module comprises:
a third extracting sub-module, configured for extracting a feature of the character region at character-level by the convolutional neural network;
a fourth extracting sub-module, configured for extracting a context feature of the character region by the recurrent neural network; and
a third recognizing sub-module, configured for performing classification and recognition on the extracted feature map by the classifier and the sequence decoder to obtain the character contained in the target image.

8. The device according to claim 5, wherein the device further comprises:
a second obtaining module, configured for obtaining sample images, a result of labeling character region of the sample images, and characters contained in the sample image; and
a training module, configured for training the deep neural network with the sample images, the result of the labeling character regions of the sample images and the characters contained in the sample images.

9. An electronic device, comprising:
a processor, a memory, a communication interface and a bus, wherein
the processor, the memory and the communication interface are connected and communicate with each other via the bus;
the memory stores executable program codes; and
the processor executes a program corresponding to the executable program codes by reading the executable program codes stored in the memory to carry out the character recognition method according to claim 1.

10. A non-transitory storage medium, wherein the storage medium is configured to store executable program codes that, when executed, performs the character recognition method according to claim 1.

* * * * *